Nov. 29, 1960    K. W. WANNER    2,962,312
TORQUE TRANSMITTING BEARING FOR PROPELLERS
Filed April 13, 1959

INVENTOR.
Keith W. Wanner
BY Price & Heneveld
ATTORNEYS

United States Patent Office 2,962,312
Patented Nov. 29, 1960

2,962,312

TORQUE TRANSMITTING BEARING FOR PROPELLERS

Keith W. Wanner, Grand Rapids, Mich., assignor to Corduroy Rubber Company, Grand Rapids, Mich., a corporation of Michigan Filed Apr. 13, 1959, Ser. No. 806,028

5 Claims. (Cl. 287—85)

This invention relates to marine propellers. More particularly, it relates to ways and means for mounting marine propellers on the drive shaft therefor.

It is known to mount propellers on the drive shafts therefor by means of an intermediate, shock absorbing, torque transmitting bearing, sometimes referred to as a cushion bearing. Such a bearing comprises a vulcanized rubber member which frictionally engages the inside diameter of the hub of the propeller. When the torque difference between the propeller shaft and propeller reaches a predetermined, maximum level, as might occur under operative conditions when the propeller strikes an immovable object, the frictional engagement is overcome and slippage occurs, leaving the propeller shaft free to rotate until the propeller is again free to move. Such a bearing functions to relieve sudden shock loads on the propeller shaft, which would tend to damage the same.

Heretofore, it has been common practice to manufacture such bearing by vulcanizing the rubber member to the outside diameter of a metallic bushing adapted to fit on the propeller shaft. In other words, it has therefore been common practice to make the rubber member an integral part of a metal bushing for the shaft. Such a construction, however, has a number of disadvantages.

One major disadvantage resides in the fact that bushing manufacturers are usually not equipped to form the rubber member on the bushing and rubber goods manufacturers are usually not equipped to manufacture the bushings. As a result, it has heretofore been necessary for bushing manufacturers to ship the bushings to the rubber goods manufacturers and for the rubber goods manufacturers to ship the bearings back to the bushing manufacturers or to the marine supplier. Thus, considerable transportation expense has heretofore been involved in manufacturing cushion bearings.

Another major disadvantage of such a construction resides in the difficulty involved in replacing the rubber member when it becomes worn. Heretofore, the cushion bearing had to be removed from the propeller shaft and shipped to a factory equipped to vulcanize rubber. Here it was necessary to remove the worn rubber member and then to rebuild a new rubber member thereon. If the bushing had an outside diameter even slightly different from that previously encountered, a new rubber mold had to be made or the outside diameter of the bushing had to be machined down to fit the existing rubber molds. In either case it is necessary that the bushing shaft have accurate outside diameters relative to the rubber mold. Thus, to replace a rubber member of the type heretofore involved includes a number of manipulative operations, a major shipping expense, and a considerable amount of time.

An object of this invention is to provide a cushion bearing for marine propellers, which avoids these disadvantages.

This and other objects which may appear as this specification proceeds are achieved by this invention which will be described in relation to the drawings which form a material part of this disclosure. A brief description of the drawings is as follows.

In general, the drawings disclose a torque transmitting bearing or cushion bearing in which the resilient, friction holding, portion thereof is a separate, movable member. The cushion bearing comprises a non-resilient bushing adapted for mounting on the propeller shaft and for receiving the resilient member. The resilient member is in the form of a bushing. Both the non-resilient bushing and the resilient bushing are adapted with means for holding the resilient bushing in position on the non-resilient bushing under normal use conditions and for transmitting torque from the non-resilient bushing to the resilient bushing.

Figure 1:
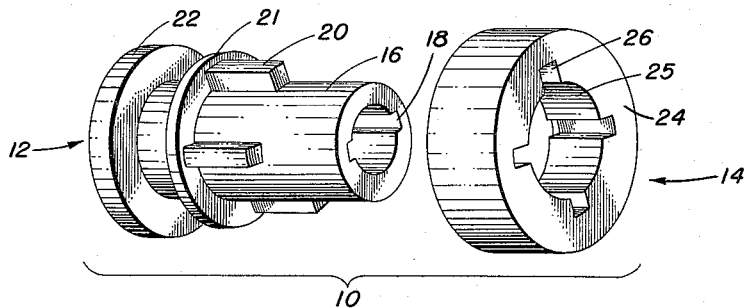
Fig. 1 is an exploded, perspective view of a preferred embodiment of the cushion bearing of this invention.

Specifically, Fig. 1 of the drawings discloses a cushion bearing 10 which comprises a non-resilient bushing 12 and a resilient bushing 14.

The non-resilient bushing 12 comprises a tube 16 having an inside diameter sufficiently greater than the outside diameter of a propeller shaft 17 (Figs. 3 and 4) so as to engage the same in sliding fit. On the inside of the tube 16 and disposed parallel to the axis thereof is at least one and preferably two keyways 18 for receiving and engaging at least one and preferably two corresponding keys 19 on the propeller shaft 17.

The outside of the tube 16 is provided with means for receiving and engaging the resilient bushing 14. These means comprise at least one and preferably a plurality of flanges 20. These flanges are preferably arranged parallel to the axis of the tube. At the forward end of the flanges 20 there is provided a centering collar 21.

The tube 16 may also be provided with an annular flange 22 at the front end thereof for use in securing the non-resilient bushing 12 to the propeller shaft 17.

Figure 2:
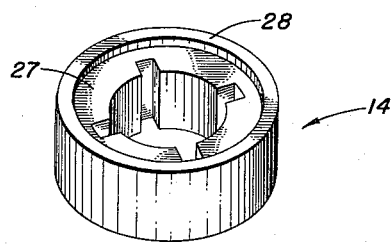
Fig. 2 is a perspective view of the front portion of the resilient bushing member of the bearing of Fig. 1.

The resilient bushing 14 comprises a cylindrical block 24 having an inner, coaxial, passageway 25. The passageway 25 has an inside diameter substantially that of the outside diameter of the tube 16. In addition, at the inside diameter of the inner passageway 25 there is provided a slot 26 for each flange 20 of the non-resilient bushing 12. The slots are preferably arranged parallel to the axis of the cylindrical block 24 and are spaced to receive the flanges 20. The front end (see Fig. 2) of the cylindrical block 24 is provided with an annular, outwardly extending lip 28. The presence of the lip 28 provides an inner annular recess 27 on the front end of the cylindrical block 24 for receiving the centering collar 21 of the non-resilient bushing 12. The outside diameter of the cylindrical block 24 is selected to provide a predetermined friction fit of the resilient bushing 14 within the hub 30 of a propeller 31 for which the cushion bearing 10 is intended (see Figs. 3 and 4). The surface at the outside diameter of the resilient bushing member is characterized by a significant coefficient of friction relative to the surface of the inside diameter of the propeller hub for which the cushion bearing 10 is intended.

The cushion bearing 10 is assembled by merely sliding the resilient bushing 14 over the back end of the non-resilient bushing 12 with the slots 26 aligned with the flanges 20. The resilient bushing 14 is pushed forwardly until the centering collar 21 is seated within the annular recess 27. The resilient bushing 14 can be removed from the non-resilient bushing 12 merely by reversing the assembly procedure.

Figures 3, 4:
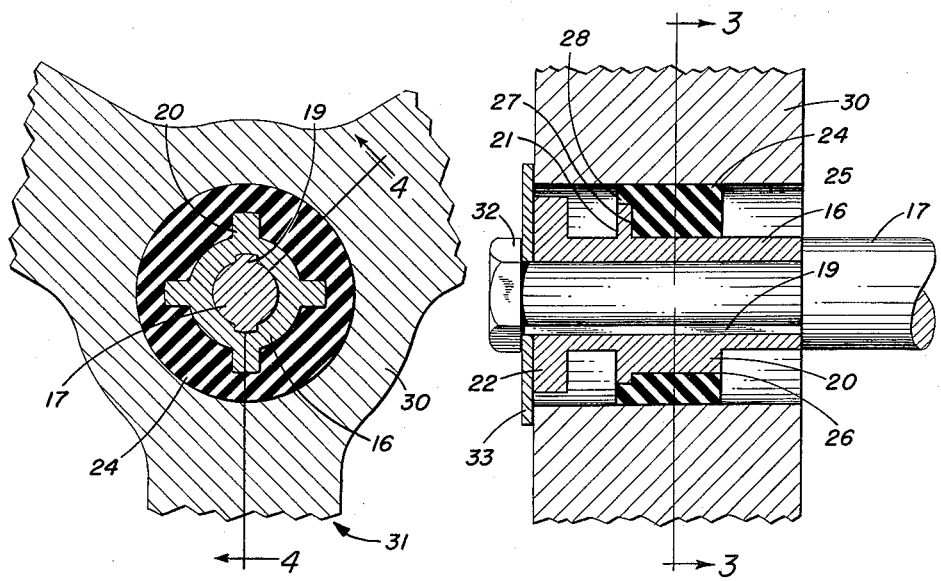
Fig. 3 is a cross sectional, fragmentary, view of a propeller hub mounted on a propeller shaft with the cushion bearing of Fig. 1, which view is taken as along the cutting plane 3—3 of Fig. 4.
Fig. 4 is a side, sectional, fragmentary, view of a propeller hub mounted on a propeller shaft with the cushion bearing of Fig. 1, which view is taken as along the cutting planes 4—4 of Fig. 3.

To mount the propeller 31 on the propeller shaft 17, the following described procedure may be used. The cushion bearing 10 is first mounted on propeller shaft 17. Then, the hub 30 of the propeller 31 is carefully thrust over the resilient bushing 14 until the front end thereof is in alignment with the front of the annular flange 21 of the non-resilient bushing 12. The usual unfastening means of the propeller shaft 17 may then be used. As shown in Fig. 4, such means comprise a threaded fastener 32 threadedly connected to the end of the propeller 31, and a washer 33 between the threaded fastener 32 and the front end of the cushion bearing 10.

To facilitate mounting the resilient bushing 14 on the non-resilient bushing 12 and mounting the propeller 31 on the cushion bearing 10, the outside diameter of the tube 16 and the outside diameter of the cylindrical block 24 may be coated with a film of petroleum jelly. When the resilient bushing 14 is composed of vulcanized rubber, the petroleum jelly becomes absorbed therein within a period of about 24 hours and without reducing the friction between the inside diameter of the hub 30 and the outside diameter of the resilient bushing 14 below that desired.

Thus, there is provided a cushion bearing which can be readily serviced. The resilient bushing can be readily mounted and can be readily removed. The parts thereof can be manufactured in standard sizes and in large quantities. No longer is it necessary to ship the bushing to the rubber manufacturer for initial and replacement mounting of the cushion to the shaft. Shipping costs are reduced thereby. Accuracy of the outside diameter of the non-resilient bushing is no longer an important factor. Other features and advantages of this invention will be apparent to those of ordinary skill in the art after reading the foregoing description.

This invention may be embodied in several forms without departing from the spirit or central characteristics thereof. Thus, in the embodiment described in the drawings, the collar 21 may be eliminated and the annular flange 22 used instead. On the other hand the annular recess 27 in the resilient bushing 14 may be eliminated, if so desired, without adversely affecting the functioning of the bushing 14. The annular recess 27 has an advantage, however, in that the lip 28 does cover the centering collar 21 or annular flange 22, as the case may be, and thereby assists in seating the resilient bushing 14 at the proper position as well as to minimize chances of damage when the resilient bushing 14 has become worn. Consequently, the embodiment just described is therefore illustrative and not restrictive, since the scope of the invention is defined by the appended claims rather than by the description preceding them, and all changes that fall within the metes and bounds of the claims, or that form their functional as well as conjointly cooperative equivalents, are therefore intended to be embraced by those claims.

I claim:

1. A torque-limiting and vibration-absorbing bearing for mounting a propeller hub on a propeller shaft and for transmitting torque from said shaft to said hub, which comprises: a non-resilient bushing member mountable on said shaft and having an outside diameter less than the inside diameter of said hub; a resilient bushing member mountable on said non-resilient bushing member and having a substantially smooth, cylindrical outer surface of a diameter selected to provide slippage between said resilient bushing member and said hub when the torque to be transmitted therebetween exceeds a predetermined amount, said cylindrical outer surface having a sufficient coefficient of friction relative to the surface of the inside diameter of said hub to prevent rotary motion of said hub with respect to said bushing member during normal operation of said propeller.

2. A torque-limiting and vibration-absorbing bearing for mounting a propeller hub on a propeller shaft and for transmitting torque from said shaft to said hub, which comprises: a non-resilient bushing member mountable on said shaft and having an outside diameter less than the inside diameter of said hub, said bushing member having at the outside diameter thereof longitudinal flange means; a resilient bushing member mounted on said non-resilient bushing member and having a substantially smooth, cylindrical outer surface of a diameter sufficient to provide slippage between said resilient bushing member and said hub when the torque to be transmitted therebetween exceeds a predetermined amount, said resilient bushing member having on the inside diameter thereof flange receiving slots corresponding to said flange means, and said cylindrical outer surface having a sufficient coefficient of friction relative to the surface of the inside diameter of said hub to prevent rotary motion of said hub with respect to said bushing member during normal operation of said propeller.

3. A torque-limiting and vibration-absorbing bearing for mounting a propeller hub on a propeller shaft and for transmitting torque from said shaft to said hub, which comprises: a non-resilient bushing member mountable on said shaft and having an outside diameter less than the inside diameter of said hub, said bushing member having at the outside diameter thereof key means aligned parallel with the axis of said shaft member and a centering collar means; a removable resilient bushing member mounted on said non-resilient bushing member and having a substantially smooth, cylindrical outer surface of a diameter selected to provide slippage between said resilient bushing member and said hub when the torque to be transmitted therebetween exceeds a predetermined amount, said resilient bushing member having at the inside diameter thereof keyway means corresponding to said key means and an annular recess corresponding to said centering collar means, said cylindrical outer surface having a sufficient coefficient of friction relative to the surface of the inside diameter of said hub to prevent rotary motion of said hub with respect to said bushing member during normal operation of said propeller.

4. A resilient bushing for mounting a marine propeller on a propeller shaft and for transmitting a limited torque from said shaft to the hub of said propeller, which comprises: a cylindrical block of resilient material having an outside diameter selected to provide a friction fit thereof with the inside diameter of said hub, an inner, coaxial passageway for receiving an inner, non-resilient bushing, said passageway comprising at the inside diameter thereof keyway means for receiving corresponding key means on the outside diameter of said inner, non-resilient bushing, said resilient block at the outside diameter thereof having a substantially smooth cylindrical surface having a sufficient coefficient of friction relative to the surface of the inside diameter of said hub to prevent rotary motion of said hub with respect to said bushing member during normal operation of said propeller.

5. A resilient bushing for mounting a marine propeller on a propeller shaft and for transmitting a limited torque from said shaft to the hub of said propeller, which comprises: a cylindrical block of resilient material having an outside diameter selected to provide a friction fit thereof with said hub, an inner, coaxial passageway for receiving an inner, non-resilient bushing, said passageway comprising at the inside diameter thereof keyway means for receiving corresponding key means on the outside diameter of said inner, non-resilient bushing, the front end of said cylindrical block comprising an inner annular recess about said inner passageway for receiving a corresponding collar of said inner, non-resilient bushing, said resilient block at the outside diameter thereof having a substantially smooth cylindrical surface having a sufficient coefficient of friction relative to the surface of the inside diameter of said hub to prevent rotary motion of said hub with respect to said bushing member during normal operation of said propeller.

References Cited in the file of this patent

UNITED STATES PATENTS

| | | |
|---|---|---|
| 331,068 | Larzelere | Nov. 24, 1885 |
| 1,772,495 | Powell | Aug. 12, 1930 |
| 1,839,094 | Geyer | Dec. 29, 1931 |
| 2,079,460 | Marty | May 4, 1937 |
| 2,235,605 | Bugatti | Mar. 18, 1941 |
| 2,724,770 | Onksen | Nov. 22, 1955 |
| 2,872,225 | Walker | Feb. 3, 1959 |
| 2,900,202 | Thompson | Aug. 18, 1959 |

FOREIGN PATENTS

| | | |
|---|---|---|
| 748,096 | France | Apr. 10, 1933 |